(12) United States Patent
Sheen

(10) Patent No.: US 9,020,623 B2
(45) Date of Patent: Apr. 28, 2015

(54) METHODS AND APPARATUS TO PROVIDE AN INFRARED SIGNAL

(75) Inventor: Timothy W. Sheen, Brighton, MA (US)

(73) Assignee: Sonos, Inc, Santa Barbara, CA (US)

( * ) Notice: Subject to any disclaimer, the term of this patent is extended or adjusted under 35 U.S.C. 154(b) by 378 days.

(21) Appl. No.: 13/527,266

(22) Filed: Jun. 19, 2012

(65) Prior Publication Data

US 2013/0338804 A1    Dec. 19, 2013

(51) Int. Cl.
*G06F 17/00* (2006.01)
*H04L 12/28* (2006.01)
*G08C 23/04* (2006.01)

(52) U.S. Cl.
CPC .............. *H04L 12/282* (2013.01); *G08C 23/04* (2013.01); *H04L 12/2838* (2013.01); *H04L 2012/2841* (2013.01)

(58) Field of Classification Search
CPC .... G08C 2201/40; G08C 23/04; G08C 17/02; H04B 7/15507
USPC .......................................................... 700/94
See application file for complete search history.

(56) References Cited

U.S. PATENT DOCUMENTS

| | | |
|---|---|---|
| 2007/0032894 A1 | 2/2007 | Uenishi et al. |
| 2007/0139214 A1 | 6/2007 | Andersen et al. |
| 2007/0269216 A1 | 11/2007 | Siu |
| 2008/0055245 A1 | 3/2008 | Migliacio et al. |
| 2008/0091309 A1* | 4/2008 | Walker .............................. 701/1 |
| 2010/0258729 A1 | 10/2010 | Roxburgh et al. |
| 2011/0312269 A1* | 12/2011 | Judd et al. .................... 455/11.1 |

OTHER PUBLICATIONS

International Searching Authority, "Search Report", issued in connection with International Patent Application No. PCT/US2013/046235, mailed on Oct. 7, 2013, 5 pages.

International Searching Authority, "Written Opinion", issued in connection with International Patent Application No. PCT/US2013/046235, mailed on Oct. 7, 2013, 6 pages.

International Bureau, "International Preliminary Report on Patentability", issued in connection with PCT patent application No. PCT/US2013/046235, mailed on Dec. 23, 2014, 7 pages.

* cited by examiner

*Primary Examiner* — Andrew C Flanders

(74) *Attorney, Agent, or Firm* — Hanley, Flight and Zimmerman, LLC

(57) ABSTRACT

Systems, methods, apparatus, and articles of manufacture to provide an infrared signal are disclosed. An example apparatus includes an infrared provider to receive a first signal from a first device. The first signal is analog and representative of a command. The example infrared provider is to linearly manipulate the first signal in analog form, wherein the manipulated signal remains analog. The example infrared provider is to relay the manipulated signal to a second device. The relayed manipulated signal is representative of the command and is indistinguishable from the first signal.

17 Claims, 9 Drawing Sheets

METHODS AND APPARATUS TO PROVIDE AN INFRARED SIGNAL

FIELD OF THE DISCLOSURE

The disclosure is related to consumer electronics and, more particularly, to methods and apparatus to provide an infrared signal.

BACKGROUND

Technological advancements have increased the accessibility of music content, as well as other types of media, such as television content, movies, and interactive content. For example, a user can access audio, video, or both audio and video content over the Internet through an online store, an Internet radio station, an online music service, an online movie service, and so on, in addition to the more traditional avenues of accessing audio and video content. Demand for audio, video, and both audio and video content inside and outside the home continues to increase.

BRIEF DESCRIPTION OF THE DRAWINGS

Features, aspects, and advantages of the presently disclosed technology are better understood with regard to the following description, appended claims, and accompanying drawings where:

Figure 1:
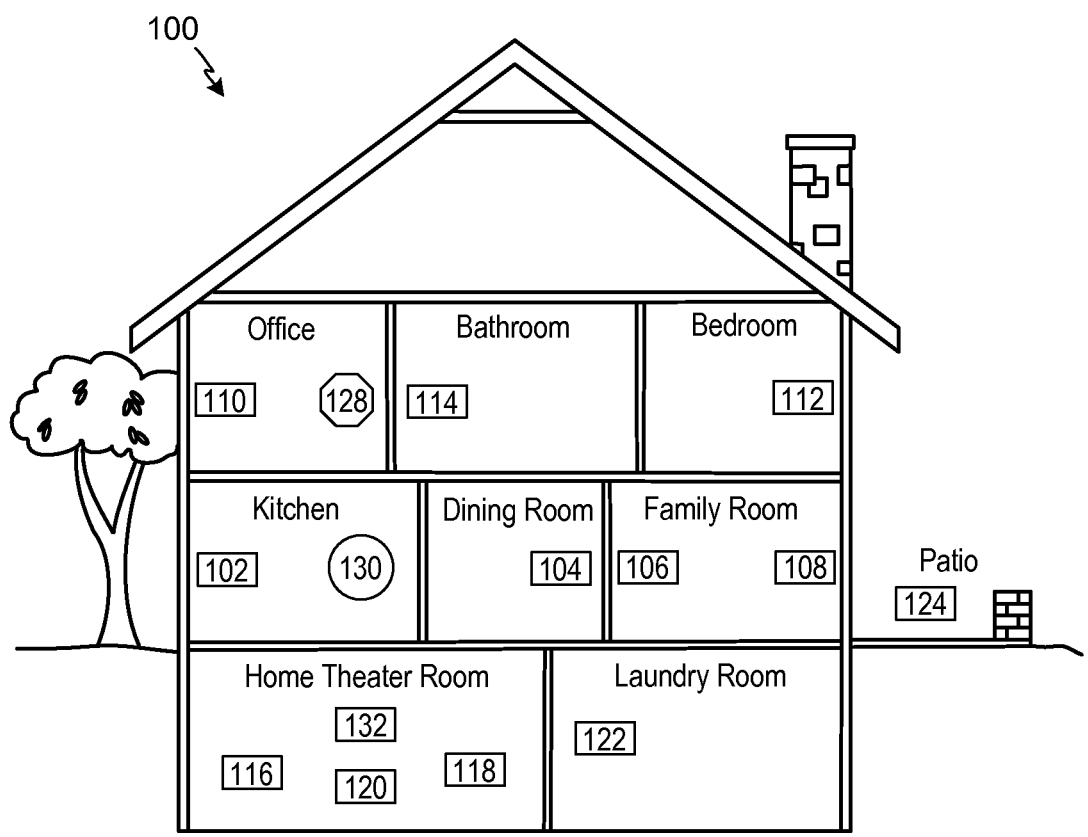
FIG. 1 shows an illustration of an example system in which embodiments of the methods and apparatus disclosed herein can be implemented.

In addition, the drawings are for the purpose of illustrating example embodiments, but it is understood that the present disclosure is not limited to the arrangements and instrumentality shown in the drawings.

DETAILED DESCRIPTION

I. Overview

An audio playback device may be used in a media presentation system to provide audio output for a display device. In an example, the audio playback device is a sound bar and the display device is a television. In such an example, the sound bar is often placed in close proximity to the television, such as, for example, along the bottom of the television screen. Many televisions include an infrared (IR) remote sensor to receive line-of-sight remote control signals to control the televisions. An IR sensor is often located along the lower portion of the television, such as, for example, the bottom bezel of the television. Nonetheless, if a sound bar is used with a television and the placement of the sound bar in some way blocks, or partially blocks, the line-of-sight to the IR sensor, then the remote control of the television may prove to be difficult or even unworkable.

To address the shadowing problem described above, a traditional audio playback device is configured to receive an IR signal from a remote control and process the IR signal to obtain the data in binary form. The traditional audio playback device may then retransmit the binary data to a display device. However, in such a previous system, processing the IR signal to produce binary data requires filtering, along with a manner to determine beginning and end times of the IR signal modulation. This extent of processing causes a delay in the data retransmission from the audio playback device to the display device.

In some instances, a display device may receive IR signals from both a remote control and the traditional audio playback device. This may happen, for example, due to the location of the audio playback device and the location of a user operating the controller. As a result, the display device will oftentimes respond erroneously, because it received and acted on two of the same IR signals, one IR signal directly from the remote control and the same, but delayed, IR signal from the audio playback device.

Example systems, methods, apparatus, and articles of manufacture disclosed herein enable an audio playback device to overcome or prevent the shadowing problem described above, allowing a display device to respond properly to the user command. Furthermore, the systems, methods, apparatus, and articles of manufacture disclosed herein may be advantageously applied to any application that uses IR control technology.

In example methods and apparatus disclosed herein, an audio playback device receives an IR signal from a user controller, manipulates the original IR signal, and relays the manipulated IR signal in analog form to a display device. In such examples, the relayed IR signal is transmitted to the display device without significant delay (e.g., not noticeable to the display device). In certain embodiments, a reduction in delay, or no delay, is due to the audio playback device not having to process the original IR signal in digital form. Additionally, the relayed IR signal remains linear and analog in nature. The relayed IR signal is indistinguishable, or substantially indistinguishable, from the original IR signal when received by the display device. Because the relayed IR signal is linear and transmitted without significant delay, the display device may receive the original IR signal from the controller and/or the relayed IR signal from the audio playback device as a single received IR signal and may process the single received IR signal.

An example apparatus includes an infrared provider to receive a first signal from a first device. The first signal is analog and representative of a command. The example infrared provider is to linearly manipulate the first signal in analog form, wherein the manipulated signal remains analog. The example infrared provider is to relay the manipulated signal to a second device. The relayed manipulated signal is representative of the command and is indistinguishable or substantially indistinguishable from the first signal by the display device.

An example method includes receiving a first signal from a first device. The first signal is analog and representative of a command. The example method includes linearly manipulating the first signal in analog form, wherein the manipulated signal remains analog. The example method includes relaying the manipulated signal to a second device. The relayed manipulated signal is representative of the command and is indistinguishable or substantially indistinguishable from the first signal by the display device.

An example audio playback device includes an audio output device to generate an audio signal based on an audio signal source. The example audio playback device includes a processor to control the audio output device. The example audio playback device includes an infrared provider to receive a first signal from a first device. The first signal is analog and representative of a command. The example infrared provider is to linearly manipulate the first signal in analog form, wherein the manipulated signal remains analog. The example infrared provider is to relay the manipulated signal to a second device. The relayed manipulated signal is representative of the command and is indistinguishable from the first signal.

Many other examples are provided herein.

II. An Example Operating Environment

Referring now to the drawings, in which like numerals can refer to like parts throughout the figures, FIG. 1 shows an example system 100 in which one or more embodiments disclosed herein can be practiced or implemented.

By way of illustration, system 100 represents a home presently configured with multiple zones, though the home could have been configured with only one zone. Each zone in the home, for example, may represent a different room or space, such as an office, bathroom, bedroom, kitchen, dining room, family room, home theater room, utility or laundry room, and patio. A single zone might also include multiple rooms if so configured. One or more of zone players 102-124 are shown in each respective zone of the home. A zone player 102-124, also referred to as a playback device, multimedia unit, speaker, player, and so on, provides audio, video, and/or audiovisual output. Controller 130 provides control to system 100. Controller 130 may be fixed to a zone, or alternatively, mobile such that it can be moved about the zones. System 100 may also include more than one controller 130. System 100 illustrates an example whole house audio system, though it is understood that the technology described herein is not limited to its particular place of application or to an expansive system like a whole house audio system 100 of FIG. 1.

a. Example zone players

Figure 2A:
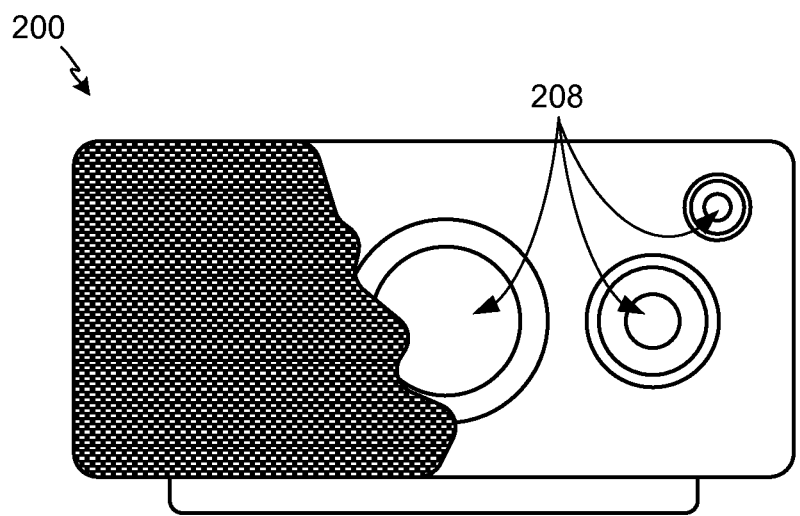
FIG. 2A shows an illustration of an example zone player having a built-in amplifier and speakers.
Figure 2B:
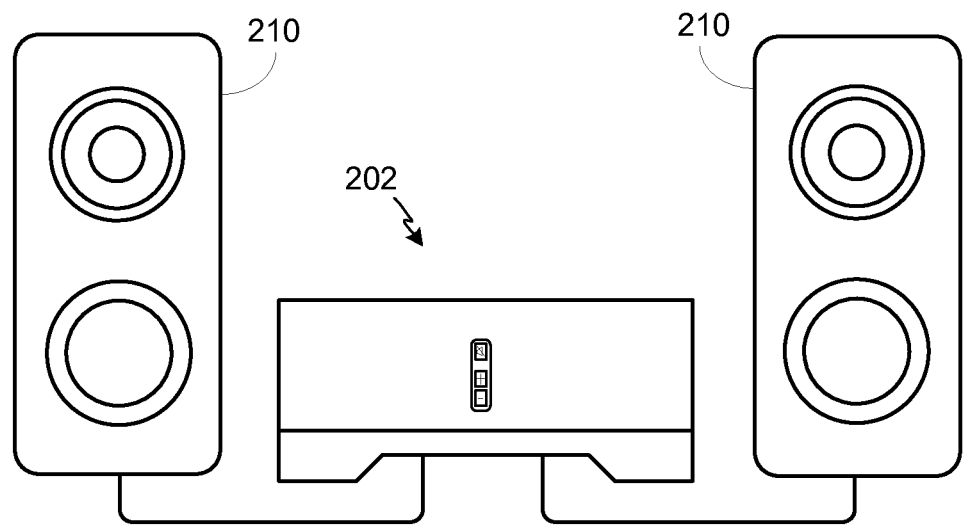
FIG. 2B shows an illustration of an example zone player having a built-in amplifier and connected to external speakers.
Figure 2C:
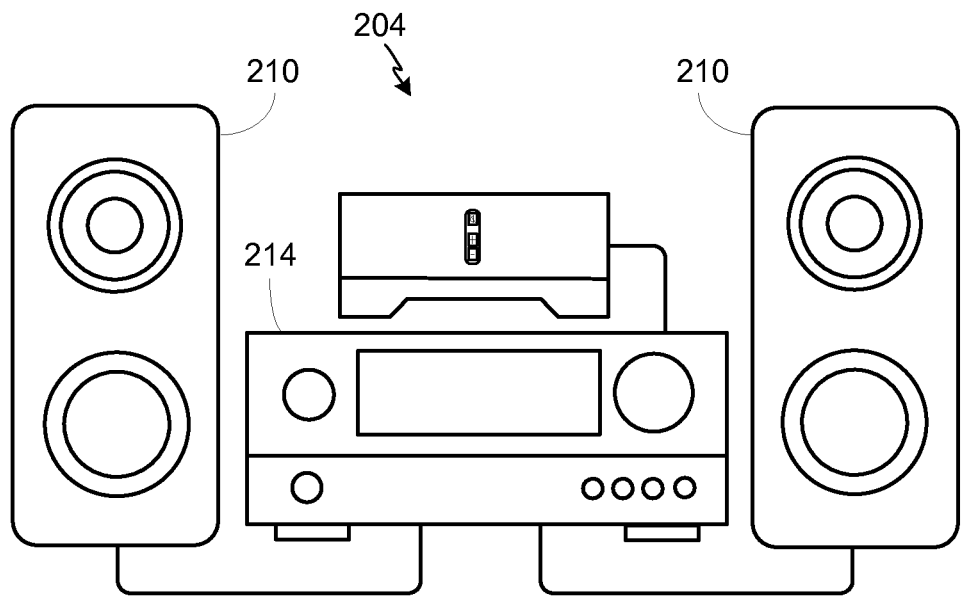
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more speakers. A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played. Each item in the queue may comprise a uniform resource identifier (URI) or some other identifier. The URI or identifier can point the zone player to the audio source. The source might be found on the Internet (e.g., the cloud), locally from another device over data network 128, the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, Calif. presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS® product offerings. For example, a zone player may include a wired or wireless headphone. In yet another example, a zone player might include a sound bar for television. In yet another example, a zone player can include or interact with a docking station for an Apple IPOD® or similar device.

b. Example controllers

Figure 3:
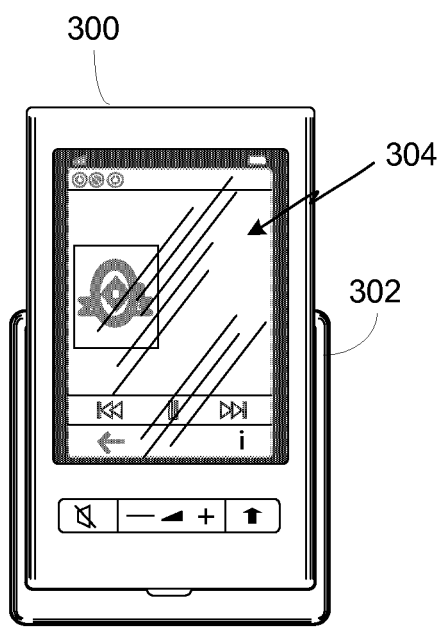
FIG. 3 shows an illustration of an example controller.

FIG. 3 illustrates an example wireless controller 300 in docking station 302. By way of illustration, controller 300 can correspond to controlling device 130 of FIG. 1. Docking station 302, if provided, may be used to charge a battery of controller 300. In some embodiments, controller 300 is provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there can be a limit set on the number of controllers that can control the system configuration 100. The controllers might be wireless like wireless controller 300 or wired to data network 128.

In some embodiments, if more than one controller is used in system 100, then each controller may be coordinated to display common content, and may all be dynamically updated to indicate changes made from a single controller. Coordination can occur, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE®, IPAD®, ANDROID™ powered phone, or any other smart phone or network-enabled device can be used as controller 130. An application running on a laptop or desktop personal computer (PC) or MAC® can also be used as controller 130. Such controllers may connect to system 100 through an interface with data network 128, a zone player, a wireless router, or using some other configured connection path. Example controllers offered by SONOS, Inc. of Santa Barbara, Calif. include a "Controller 200," "SONOS® CONTROL," "SONOS® Controller for IPHONE®," "SONOS® Controller for IPAD®," "SONOS® Controller for ANDROIDTM," "SONOS® Controller for MAC® or PC."

c. Example data connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SonosNet protocol, developed by SONOS, Inc. of Santa Barbara. SonosNet represents a secure, AES-encrypted, peer-to-peer wireless mesh network. Alternatively, in certain embodiments, the data network 128 is the same network, such as a traditional wired or wireless network, used for other applications in the household.

d. Example zone configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example audio sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and a played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AIRPLAY®, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to a display device such as a television 132. In some examples, the television 132 is used as a source of audio for the home theater zone players 116, 118, 120, while in other examples audio information from the television 132 can be shared with any of the zone players 102-124 in the audio system 100.

f. Example home theater

Figure 4:
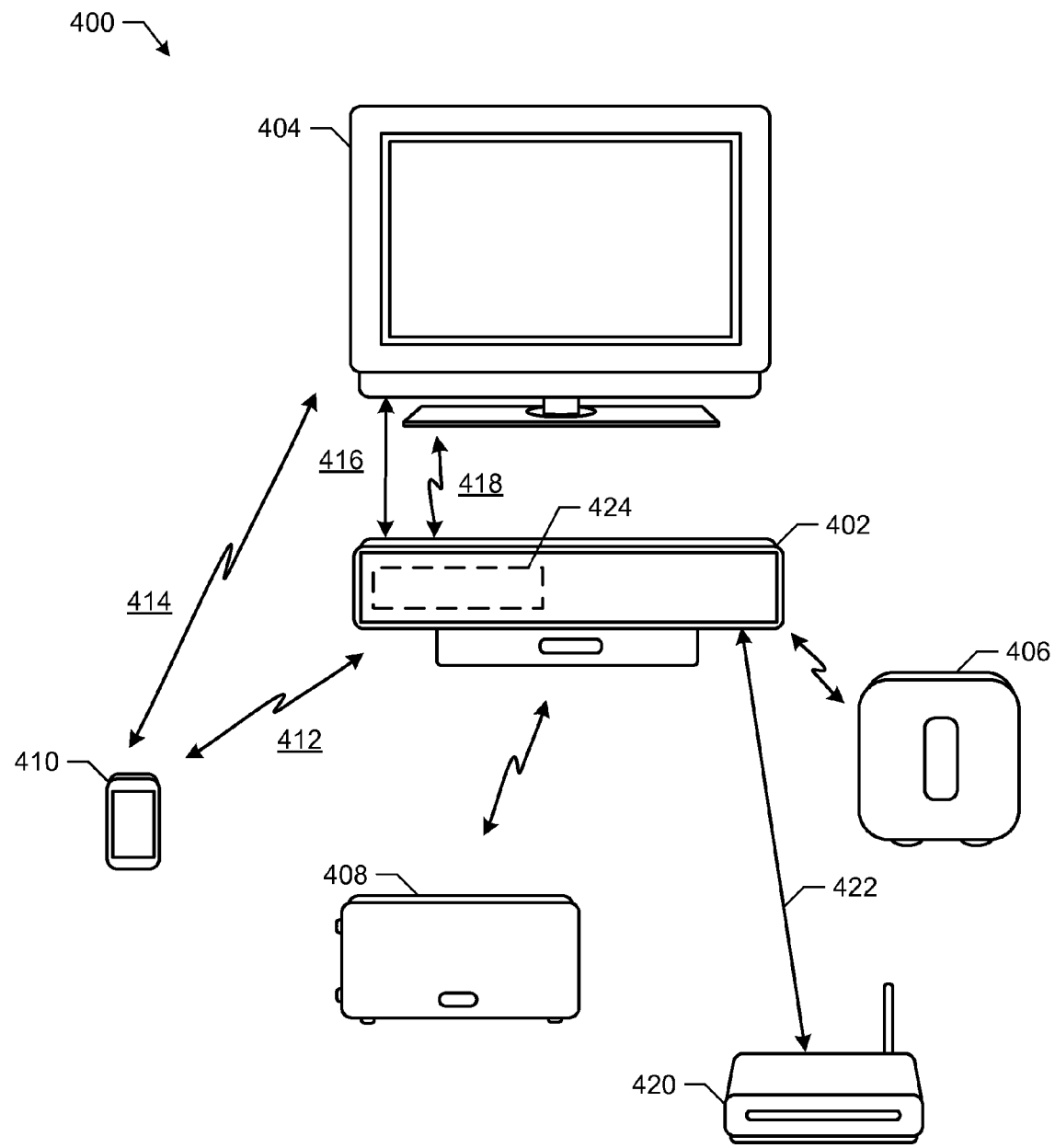
FIG. 4 shows an example system including an audio playback device and a display device.

FIG. 4 shows an example system 400 including an audio playback device 402 and a display device 404. The example audio playback device 402 of FIG. 4 is a zone player such as a sound bar. However, a zone player may include any type of audio reproduction device. The example audio playback device 402 is located within a zone that also includes additional zone players such as a subwoofer 406 and a rear surround device 408. The illustrated example of FIG. 4 can be used as a home theater system in combination with a television (e.g., the display device 404). It is understood, however, that subwoofer 406 and rear surround device 408 are not necessary for the reproduction of audio in conjunction with display device 404, but can provide additional sound effects for the listener, such as deeper bass and rear/side sound effects.

A controller 410 is in communication with the audio playback device 402 and/or the display device 404. The controller 410 can include one or more of a remote control. For example, the remote control may correspond to the television, a universal remote control, a sound bar in addition to the television, and so on. The controller 410 includes one or more command buttons or soft keys (e.g., software configurable buttons such as those found on a touchscreen control device) to be pressed by a user to issue commands to the display device 404. Example commands can include power ON/OFF, volume up, volume down, mute, channel control, and so on.

The example audio playback device 402 communicates with the controller 410 via a wireless connection 412. In some embodiments, using the controller 410, a user of the system 400 can control the example audio playback device 402 to, for example, change an audio output volume of the audio playback device 402 (e.g., increase volume, decrease volume, mute, and so on), change a signal source from which the audio playback device 402 is to obtain audio information to be played, configure which zones are to play audio from particular audio information sources, and/or perform any other settings and/or configuration adjustment to the audio playback device 402.

The example display device 404 communicates with the controller 410 via a wireless connection 414, for example. Using the controller 410, a user of the system 400 can control the example display device 404 to, for example, communicate a volume command to the display device 404, change an input to the display device 404, power the display device 404 on and/or off, and/or otherwise perform any other settings and/or configuration adjustment to the display device 404. In some embodiments, the audio playback device 402 can learn which remote control is being used to control the display device 404.

In the illustrated example, the controller 410 controls both the audio playback device 402 and the display device 404 (e.g., the controller 410 is a universal remote control). The controller 410 can selectively and/or simultaneously interact with the audio playback device 402 and the display device 404. In some such examples, the audio playback device 402 and the display device 404 transmit messages and receive commands depending on which of the audio playback device 402 and the display device 404 the controller 410 is configured to interact with for a given command. In some examples, the audio playback device 402 and the display device 404 may each have a dedicated user input device. For example, separate controllers may be used to control each of the audio playback device 402 and the display device 404.

In the illustrated example of FIG. 4, the audio playback device 402 is coupled to the example display device 404 via a wired connection 416 and/or a wireless connection 418. The wired connection 416 and/or the wireless connection 418 transmit audio information, control messages, commands, audio and/or video metadata, and/or other information between the audio playback device 402 and the display device 404. An example wired connection that may be used to implement the wired connection 416 is an optical fiber connection like TOSLINK, an audio connection using RCA connectors, a multi-media connection using HDMI, a data connection using Ethernet, some other wired connection, or some combination thereof. The wireless connections 412, 414, 418 can be an infrared (IR) connection, a radio frequency (RF) connection, a Bluetooth connection, any other wireless connection, or some combination thereof. While some display devices, such as televisions, are provided with audio output mechanisms (e.g., speakers), in the example system 400, the audio playback device 402 outputs the audio instead of (or in complement to) any audio output mechanisms on the display device 404.

In some embodiments, the example audio playback device 402 can select between multiple different sources of audio information, of which one is the display device 404. In some examples, the display device 404 represents multiple potential sources of audio information when the display device 404 functions as a switch or hub for additional devices. In some embodiments, the display device 404 is a television that can switch between different input devices such as video game consoles, cable, satellite, and/or broadcast television programs, DVD players, Blu-ray players, video cassette players, digital video players, and/or any other input device.

In addition to the example display device 404, the audio playback device 402 can select other audio information sources, such as network-based audio information sources. Network-based audio information sources may be accessed, for example, via a router 420 or another network-enabled device (e.g., IPAD®, IPHONE®, or ANDROID™ device that connects to the Internet directly to a data network). The example audio playback device 402 is coupled to the example router 420 or other network-enabled device via a wired or wireless connection 422, which enables access to network-based audio information sources (e.g., via the Internet and/or a local area network). In another example, the audio playback device 402 has direct access to network-based audio information sources through, for example, a 3G or 4G connection or a broadband connection directly.

The example messages transmitted and received by the example audio playback device 402 and the example display device 404 may be packet-based messages, such as Ethernet packets. The type of the message (e.g., volume message, source message, and so on) and/or any additional information (e.g., volume up, volume down, mute, unmute, specified audio information source, and so on) can be carried, for example, in the payload of the packet-based message. Data may additionally or alternatively be transmitted and received by the example audio playback device 402 and the example display device 404 using IR signals.

The example system 400 of FIG. 4 may be divided into multiple groups. Each of the groups may be located, for example, in a different room of a larger location (e.g., a house). The example controller 410 is mobile and may be in the same physical location as any example group, or neither of them, at any given time. Example groups may be positioned in different locations or may be combined at a user's direction (e.g., via the controller 410) such that the devices 402, 404, 406, 408 play the same audio or different audio channels in synchrony. The user may additionally or alternatively direct a group to play audio originating from the display device 404 while another group plays other audio originating from another source of audio information (e.g., via the router 420).

Any of the example audio playback device 402, the display device 404, the subwoofer 406, and/or the rear sound device 408 may be grouped in a master-slave arrangement, where one of the devices 402-408 communicates with another of the devices 402-408 and/or the router 420 to receive and/or provide audio information, synchronizing signals, and/or commands. The example devices 402-408 then communicate with each other to receive and/or provide audio information, synchronizing signals, and/or commands.

The example audio playback device 402 includes an example IR provider 424 to facilitate communication between the example controller 410 and the example display device 404. In some examples, the audio playback device 402 may be located in front of the example display device 404 such that the display device 404 is impaired in receiving signals and/or commands from the controller 410. For example, the audio playback device 402 may be located in front of an IR receiver on the example display device 404. The example IR provider 424 enables the audio playback device 402 to receive IR signals from the controller 410 (or any other device within the system 400), to manipulate the IR signals, and to relay the manipulated IR signals in a manner which enables the display device 404 to receive and process the IR signals.

In the illustrated example, responsive to a user activating a key, button, or command on the controller 410, the controller 410 may send an IR signal (e.g., a command) in the direction of the display device 404 via the example wireless connection 414. However, due to the positioning of the audio playback device 402 and/or the display device 404, it is possible that the path of the IR signal to the display device 404 is blocked by the audio playback device 402 and not blocked in other instances. In some embodiments, regardless of whether the IR signal to the display device 404 is blocked or not, the IR signal is received by the audio playback device 402 via the example wireless connection 412. The example IR provider 424 manipulates the original IR signal and relays the manipulated IR signal to the display device 404 linearly and without significant (e.g., noticeable) delay to the display device 404. The example IR provider 424 transmits the manipulated IR signal to the display device 404 via the example wireless connection 418. In some embodiments, the manipulated IR signal is transmitted to the display device 404 without significant delay because the IR signal is not processed in digital form. In some examples, the IR provider 424 creates a second IR signal representative of the original IR signal and transmits the second IR signal to the display device 404. In some examples, the IR provider 424 creates the only IR signal received by the display device 404 due to the blocking of the IR sensor on the display device 404 by the audio playback device 402. As a result, irrespective of whether one or two IR signals (or portions of the IR signal(s)) reach an IR sensor on the display device 404, the audio playback device, in some embodiments, ensures that the display device 404 receives the correct user intended command.

In the illustrated example, the example display device 404 may receive at least the relayed IR signal from the audio playback device 402 and processes the relayed IR signal to execute the command (e.g., to change an audio source). In some examples, the display device 404 receives the original IR signal (or a portion thereof) from the controller 410 via the example wireless connection 414 and receives the relayed IR signal (or a portion thereof) from the audio playback device 402 via the example wireless connection 418. In such an example, because the example IR provider 424 relayed the manipulated IR signal linearly and without significant delay, the display device 404 is able to process the original IR signal and the relayed IR signal as a single IR signal. In other words, the received IR signal at the display device 404 is a combination of the original IR signal from the controller 410 and the relayed IR signal from the audio playback device 402 (e.g., the received IR signal is a sum of the original and relayed IR signals). Thus, the display device 404 is unable to distinguish between the separate IR signals and processes the received IR signal as a single instruction. In previous systems, where IR signals were repeated in digital form, there was a significant delay in the transmission of the repeated IR signal. In such previous systems, a display device receiving the original IR signal and the repeated digital IR signal would be unable to process either IR signal. The example IR provider 424 is described in greater detail below in connection with FIG. 7.

III. Zone Players

Figure 5:
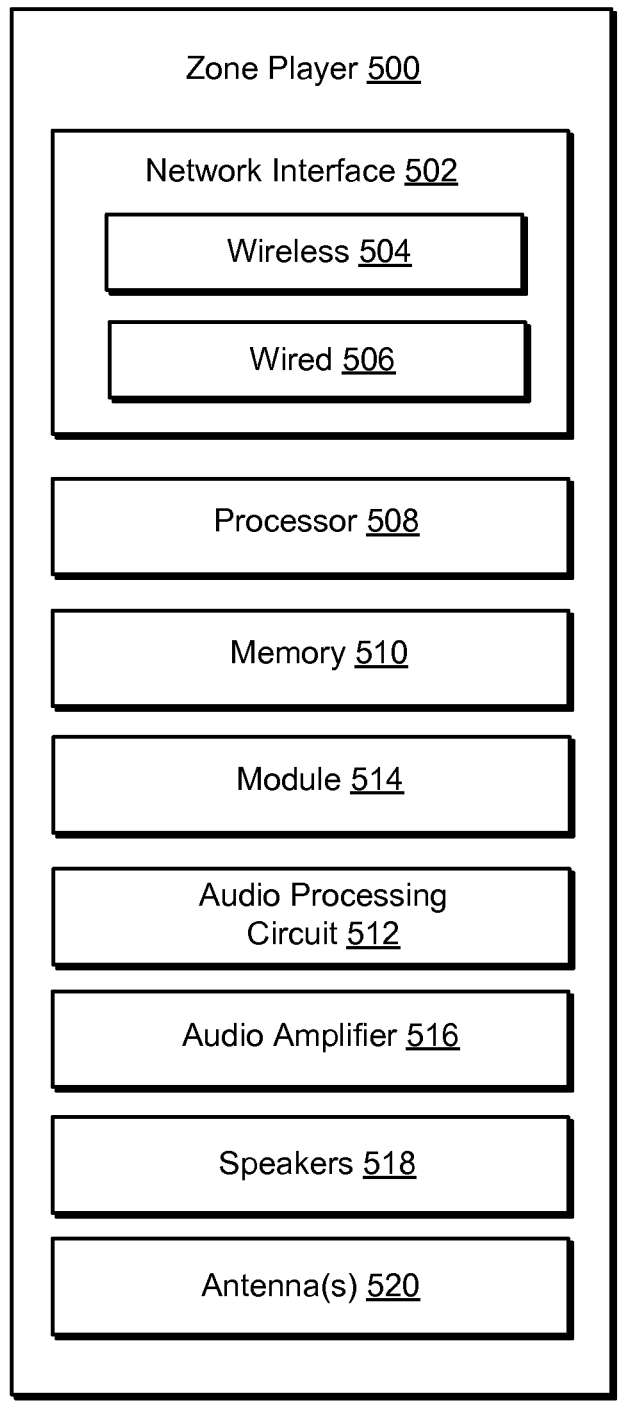
FIG. 5 shows an internal functional block diagram of an example zone player.

Referring now to FIG. 5, there is shown an example block diagram of a zone player 500 in accordance with an embodiment. Zone player 500 includes a network interface 502, a processor 508, a memory 510, an audio processing component 512, one or more modules 514, an audio amplifier 516, and a speaker unit 518 coupled to the audio amplifier 516. FIG. 2A shows an example illustration of such a zone player. Other types of zone players may not include the speaker unit 518 (e.g., such as shown in FIG. 2B) or the audio amplifier 516 (e.g., such as shown in FIG. 2C). Further, it is contemplated that the zone player 500 can be integrated into another component. For example, the zone player 500 could be constructed as part of a television, lighting, or some other device for indoor or outdoor use.

In some embodiments, network interface 502 facilitates a data flow between zone player 500 and other devices on a data network 128. In some embodiments, in addition to getting audio from another zone player or device on data network 128, zone player 500 may access audio directly from the audio source, such as over a wide area network or on the local network. In some embodiments, the network interface 502 can further handle the address part of each packet so that it gets to the right destination or intercepts packets destined for the zone player 500. Accordingly, in certain embodiments, each of the packets includes an Internet Protocol (IP)-based source address as well as an IP-based destination address.

In some embodiments, network interface 502 can include one or both of a wireless interface 504 and a wired interface 506. The wireless interface 504, also referred to as a radio frequency (RF) interface, provides network interface functions for the zone player 500 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, or 802.15). Wireless interface 504 may include one or more radios. To receive wireless signals and to provide the wireless signals to the wireless interface 504 and to transmit wireless signals, the zone player 500 includes one or more antennas 520. The wired interface 506 provides network interface functions for the zone player 500 to communicate over a wire with other devices in accordance with a communication protocol (e.g., IEEE 802.3). In some embodiments, a zone player includes both of the interfaces 504 and 506. In some embodiments, a zone player 500 includes only the wireless interface 504 or the wired interface 506.

In some embodiments, the processor 508 is a clock-driven electronic device that is configured to process input data according to instructions stored in memory 510. The memory 510 is data storage that can be loaded with one or more software module(s) 514, which can be executed by the processor 508 to achieve certain tasks. In the illustrated embodiment, the memory 510 is a tangible machine-readable medium storing instructions that can be executed by the processor 508. In some embodiments, a task might be for the zone player 500 to retrieve audio data from another zone player or a device on a network (e.g., using a uniform resource locator (URL) or some other identifier). In some embodiments, a task may be for the zone player 500 to send audio data to another zone player or device on a network. In some embodiments, a task may be for the zone player 500 to synchronize playback of audio with one or more additional zone players. In some embodiments, a task may be to pair the zone player 500 with one or more zone players to create a multi-channel audio environment. Additional or alternative tasks can be achieved via the one or more software module(s) 514 and the processor 508.

The audio processing component 512 can include one or more digital-to-analog converters (DAC), an audio preprocessing component, an audio enhancement component or a digital signal processor, and so on. In some embodiments, the audio processing component 512 may be part of processor 508. In some embodiments, the audio that is retrieved via the network interface 502 is processed and/or intentionally altered by the audio processing component 512. Further, the audio processing component 512 can produce analog audio signals. The processed analog audio signals are then provided to the audio amplifier 516 for play back through speakers 518. In addition, the audio processing component 512 can include circuitry to process analog or digital signals as inputs to play from zone player 500, send to another zone player on a network, or both play and send to another zone player on the network. An example input includes a line-in connection (e.g., an auto-detecting 3.5 mm audio line-in connection).

The audio amplifier 516 is a device(s) that amplifies audio signals to a level for driving one or more speakers 518. The one or more speakers 518 can include an individual transducer (e.g., a "driver") or a complete speaker system that includes an enclosure including one or more drivers. A particular driver can be a subwoofer (e.g., for low frequencies), a mid-range driver (e.g., middle frequencies), and a tweeter (e.g., high frequencies), for example. An enclosure can be sealed or ported, for example. Each transducer may be driven by its own individual amplifier.

A commercial example, presently known as the PLAY:5, is a zone player with a built-in amplifier and speakers that is capable of retrieving audio directly from the source, such as on the Internet or on the local network, for example. In particular, the PLAY:5 is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, but from different channels of audio. Audio from Internet radio stations, online music and video services, downloaded music, analog audio inputs, television, DVD, and so on, can be played from the PLAY:5.

IV. Controller

Figure 6:
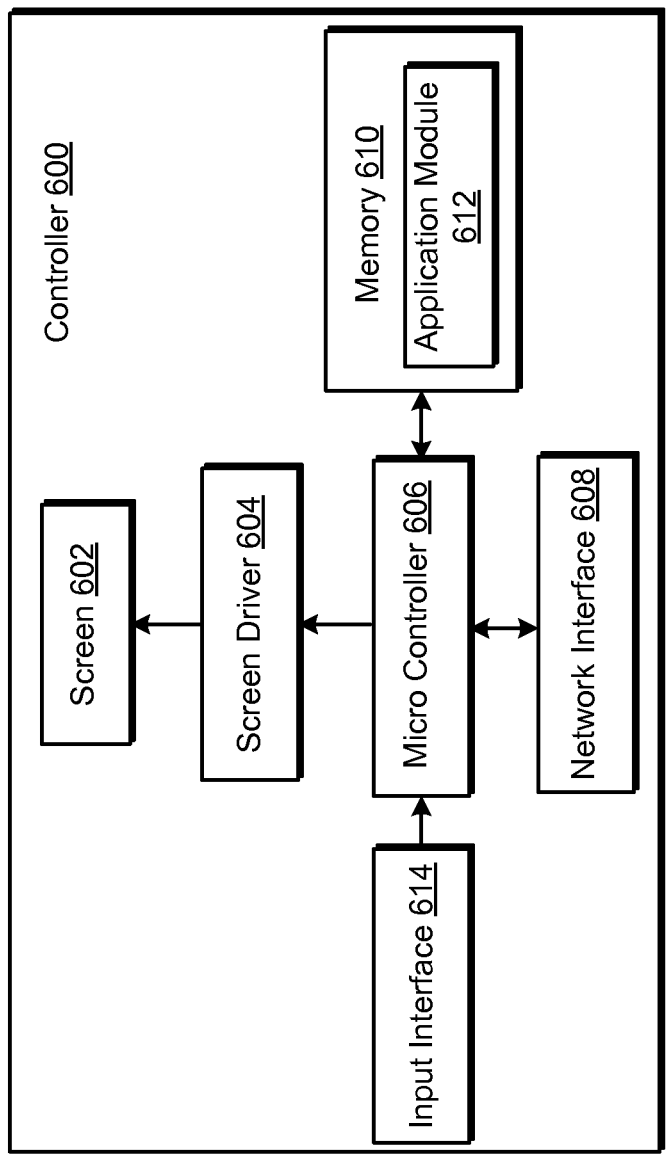
FIG. 6 shows an internal functional block diagram of an example controller.

Referring now to FIG. 6, there is shown an example block diagram for controller 600, which can correspond to the controlling device 130 in FIG. 1. Controller 600 can be used to facilitate the control of multi-media applications, automation and others in a system. In particular, the controller 600 may be configured to facilitate a selection of a plurality of audio sources available on the network and enable control of one or more zone players (e.g., the zone players 102-124 in FIG. 1) through a wireless or wired network interface 608. According to one embodiment, the wireless communications is based on an industry standard (e.g., infrared, radio, wireless standards including IEEE 802.11a, 802.11b 802.11g, 802.11n, or 802.15, and so on). Further, when a particular audio is being accessed via the controller 600 or being played via a zone player, a picture (e.g., album art) or any other data, associated with the audio and/or audio source can be transmitted from a zone player or other electronic device to controller 600 for display.

Controller 600 is provided with a screen 602 and an input interface 614 that allows a user to interact with the controller 600, for example, to navigate a playlist of many multimedia items and to control operations of one or more zone players. The screen 602 on the controller 600 can be an LCD screen, for example. The screen 600 communicates with and is commanded by a screen driver 604 that is controlled by a microcontroller (e.g., a processor) 606. The memory 610 can be loaded with one or more application modules 612 that can be executed by the microcontroller 606 with or without a user input via the user interface 614 to achieve certain tasks. In some embodiments, an application module 612 is configured to facilitate grouping a number of selected zone players into a zone group and synchronizing the zone players for audio play back. In some embodiments, an application module 612 is configured to control the audio sounds (e.g., volume) of the zone players in a zone group. In operation, when the microcontroller 606 executes one or more of the application modules 612, the screen driver 604 generates control signals to drive the screen 602 to display an application specific user interface accordingly.

The controller 600 includes a network interface 608 that facilitates wired or wireless communication with a zone player. In some embodiments, the commands such as volume control and audio playback synchronization are sent via the network interface 608. In some embodiments, a saved zone group configuration is transmitted between a zone player and a controller via the network interface 608. The controller 600 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE®, IPAD® or any other smart phone or network-enabled device (e.g., a networked computer such as a PC or MAC®) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 600. The zone players in the zone group can play audio in a synchronized fashion, such that all of the zone players in the zone group play back an identical audio source or a list of identical audio sources in a synchronized manner such that no (or substantially no) audible delays or hiccups are to be heard. Similarly, in some embodiments, when a user increases the audio volume of the group from the controller 600, the signals or data of increasing the audio volume for the group are sent to one of the zone players and causes other zone players in the group to be increased together in volume.

A user via the controller 600 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would need to manually and individually link each zone. The single command may include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

IV. Example Infrared Provider

Figure 7:
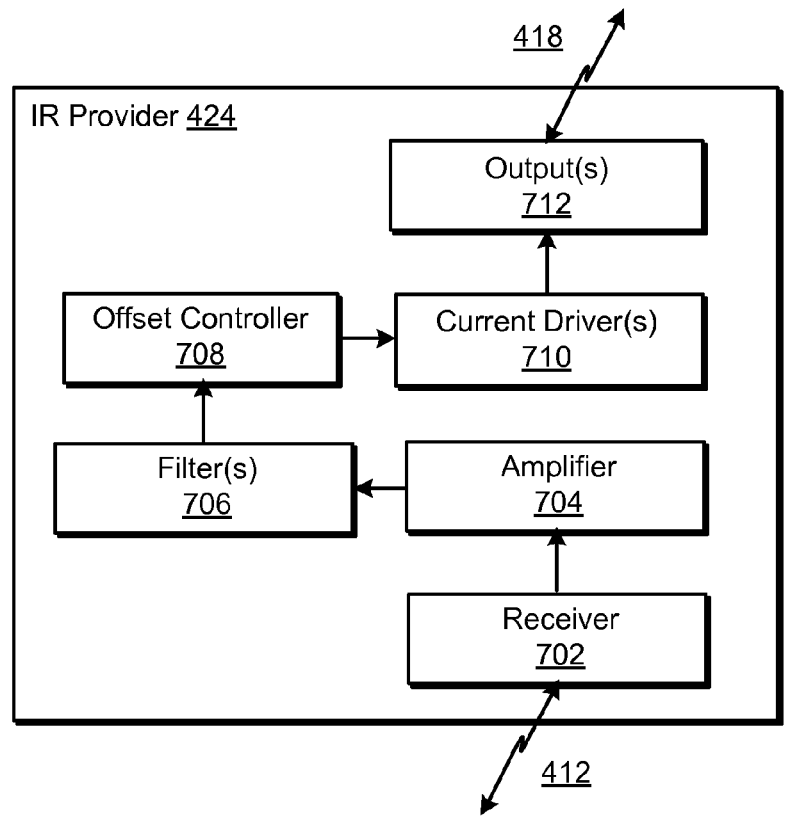
FIG. 7 shows an internal functional block diagram of an example infrared provider.

FIG. 7 shows an internal functional block diagram of the example IR provider 424 within the example audio playback device 402 to facilitate communication between devices (e.g., between the controller 410 and the display device 404 of FIG. 4). The example IR provider 424 receives an IR signal from the controller 410, manipulates the IR signal, and relays the manipulated IR signal to the display device 404. The manipulated IR signal retains the linear, analog nature of the original IR signal received from the controller 410 and is indistinguishable from the original IR signal when received by the display device 404. The example IR provider 424 of FIG. 7 includes a receiver 702, an amplifier 704, filter(s) 706, an offset controller 708, current driver(s) 710, and output(s) 712.

The example receiver 702 receives an IR signal from a device (e.g., the controller 410). The IR signal received from the controller 410 may be directed by a user to the audio playback device 402 and/or the display device 404. The receiver 702 may be implemented using, for example, photodiodes.

The example amplifier 704 amplifies the IR signal received by the receiver 702 (e.g., the amplifier 704 increases the strength of the IR signal). The amplifier 704 may be implemented using, for example, any appropriate amplifying circuit.

The example filter(s) 706 filter the amplified IR signal. For example, other devices within a media system (e.g., fixed light sources) may emit some IR light. This miscellaneous IR light is unrelated to the IR signal transmitted from the controller 410 and, thus, the example filter(s) 706 are used to remove the miscellaneous IR light from the amplified IR signal. Many control systems (e.g., the controller 410) modulate IR signals at 38 kHz. Thus, the filter(s) 706 may implement a band pass filter around 38 kHz, for example. Additionally, there may be some direct current (DC) offset within the amplified IR signal which is removed by the example filter(s) 706. The filter(s) 706 may be implemented using, for example, any appropriate filtering circuit(s).

The example offset controller 708 controls the DC offset of the filtered IR signal. Outputting a linear IR signal (or substantially linear IR signal) enables the display device 404 to receive and process IR signals from both the controller 410 and the audio playback device 402 at substantially the same time because linear signals may be combined and processed as a single IR signal. To enable the IR provider 424 to output a linear IR signal, the example offset controller 708 adds a controlled DC offset to the filtered IR signal. The filtered IR signal is offset to allow the IR signal to be biased on (e.g., to allow a light-emitting diode (LED) to emit a background of steady, minimal IR light). This stream of background IR light allows the display device 404 to interpret a decrease in the IR light as "negative light." The example offset controller 708 adds the DC offset to the filtered IR signal in a controlled manner so that each IR signal processed by the audio playback device 402 is offset by a sufficient amount to be interpreted by the display device 404. The offset controller 708 may be implemented using, for example, any appropriate circuitry.

The example current driver(s) 710 provide linear current sources for the offset IR signal to drive the example output(s) 712. The example output(s) 712 may be implemented using, for example, light-emitting diodes (LEDs). LEDs emit light proportional to the current flowing through them. Thus, the example current driver(s) 710 provide linear current sources to enable the IR provider 424 to output a linear IR signal. The example output(s) 712 output the manipulated IR signal. In some examples, if the relayed IR signal becomes non-linear in nature, the relayed IR signal will appear digital in nature (e.g., the relayed IR signal is transmitted as a stream of ones and zeros). In such an example, the display device 404 may be capable of processing the relayed IR signal as the relayed IR signal was transmitted without significant (e.g., noticeable to the display device 404) delay. The example current driver(s) 710 may be implemented using, for example, any appropriate circuitry. Any number and/or types of current driver(s) 710 and/or output(s) 712 may be used to provide the manipulated IR signal to the display device 404. For example, a plurality of LEDs may be placed along the back side of the audio playback device 402 to allow the display device 404 to receive the relayed IR signal from a variety of positions.

Figure 8:
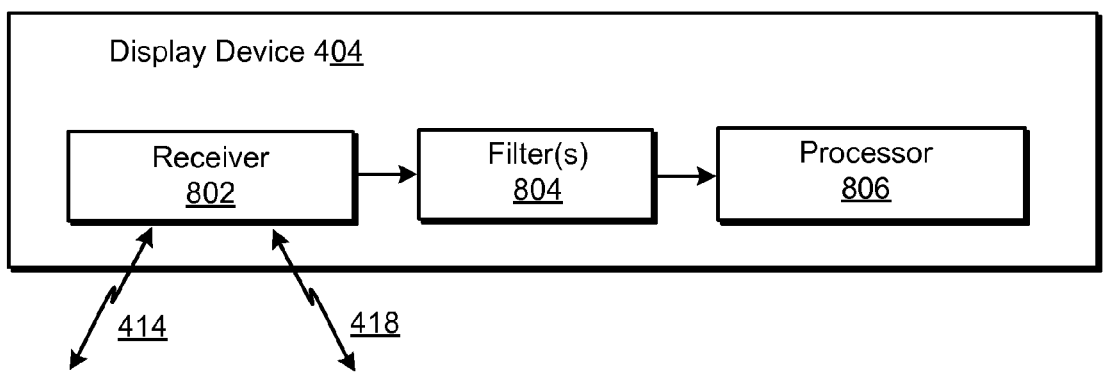
FIG. 8 shows an internal functional block diagram of an example display device.

FIG. 8 shows an internal functional block diagram of the example display device 404 to receive and process signals and/or commands. In the illustrated example, the display device 404 receives IR signals from one or more devices (e.g., the controller 410, the audio playback device 402 of FIG. 2, or both in some instances). The example display device 404 of FIG. 8 includes a receiver 802, filter(s) 804, and a processor 806.

The example receiver 802 receives signals and/or commands from the controller 410 via the example wireless connection 414 and/or from the audio playback device 402 via the example wireless connection 418. Example commands include volume commands (e.g., volume up, volume down, mute, unmute) and/or input selection commands (e.g., which of a set of input devices are to be a source of audio and/or video information), and so on. In the illustrated example, the received commands are IR signals, which contain infrared light pulses.

As described above, the example IR provider 424 of the example audio playback device 402 receives an IR signal from the controller 410, manipulates the IR signal, and relays the manipulated IR signal linearly and without significant delay. The example receiver 802 receives at least the relayed IR signal from the audio playback device 402. The example receiver 802 may additionally (or alternatively) receive the original IR signal (or a portion thereof) from the controller 410. For example, the audio playback device 402 may not completely block the original IR signal from the controller 410 such that the receiver 802 receives both the original IR signal from the controller 410 and the relayed IR signal provided by the audio playback device 402 as a single IR signal. Because the relayed IR signal was manipulated and transmitted linearly and without significant delay, the combination of the original and relayed IR signals received by the receiver 802 (e.g., the received IR signal is the sum of the original and relayed IR signals) may be processed by the display device 404 (e.g., at the processor 806) without incorrect or adverse effect. The receiver 802 may be implemented using, for example, photodiodes.

The example filter(s) 804 filter at least the relayed IR signal (e.g., the relayed IR signal or the combination of the original and relayed IR signals as a single received IR signal). As described above, other devices within a media system (e.g., fixed light sources) may emit some IR light. This miscellaneous IR light is unrelated to the IR signals transmitted from the controller 410 and/or the audio playback device 402 and, thus, the example filter(s) 804 are used to remove the miscellaneous IR light from the received IR signal. For example, the filter(s) 804 may implement a band pass filter around 38 kHz to remove unwanted IR light. Additionally, there may be some DC offset within the received IR signal which is removed by the example filter(s) 804, for example. The filter(s) 804 may be implemented using, for example, any appropriate filtering circuit(s).

The example processor 806 of FIG. 8 controls various functions of the example display device 404 (e.g., volume functions, audio source functions, etc.) based on at least the relayed IR signal. For example, if the command transmitted within the original and/or relayed IR signal indicates that a volume is to be increased, the processor 806 demodulates at least the relayed IR signal to identify the transmitted command and implements a volume increase.

While the example IR provider 424 and the example display device 404 have been illustrated in FIGS. 7 and 8, one or more of the interfaces, data structures, elements, processes and/or devices illustrated in FIGS. 7 and 8 can be combined, divided, re-arranged, omitted, eliminated and/or implemented in any way. Further, the example receiver 702, the example amplifier 704, the example filter(s) 706, the example offset controller 708, the example current driver(s) 710, the example output(s) 712, the example receiver 802, the example filter(s) 804, the example processor 806, and/or more generally, the example IR provider 424 and/or the example display device 404 can be implemented by hardware, software, firmware and/or any combination of hardware, software and/or firmware. Thus, for example, any of the example receiver 702, the example amplifier 704, the example filter(s) 706, the example offset controller 708, the example current driver(s) 710, the example output(s) 712, the example receiver 802, the example filter(s) 804, the example processor 806, and/or more generally, the example IR provider 424 and/or the example display device 404 could be implemented by one or more circuit(s), programmable processor(s), application specific integrated circuit(s) (ASIC(s)), programmable logic device(s) (PLD(s)) and/or field programmable logic device(s) (FPLD(s)), and so on.

When any apparatus claim of this patent is read to cover a purely software and/or firmware implementation, at least one of the example receiver 702, the example amplifier 704, the example filter(s) 706, the example offset controller 708, the example current driver(s) 710, the example output(s) 712, the example receiver 802, the example filter(s) 804, and/or the example processor 806 are hereby expressly defined to include a computer readable medium such as a memory, DVD, CD, and so on, storing the software and/or firmware. Further still, the example IR provider 424 and/or the example display device 404 can include one or more elements, processes and/or devices in addition to, or instead of, those illustrated in FIGS. 7 and 8, and/or can include more than one of any or all of the illustrated elements, processes and devices.

Figure 9:
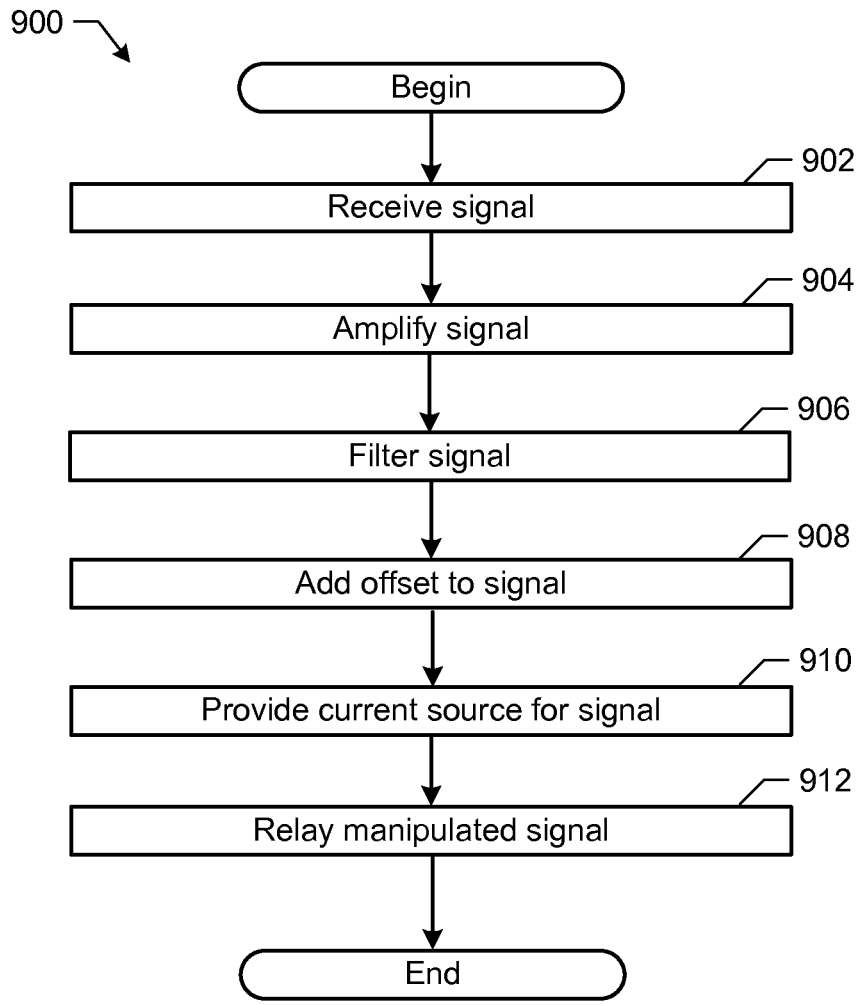
FIG. 9 shows a flowchart representative of an example method to provide an infrared signal.

FIG. 9 shows a flowchart representative of an example method 900 to provide an infrared signal. The example method 900 of FIG. 9 begins when the example receiver 702 receives an IR signal from a user input device (e.g., the controller 410 of FIG. 4) (block 902). The IR signal received from the controller 410 may be directed by a user to the audio playback device 402 and/or the display device 404. The example amplifier 704 amplifies the IR signal received by the receiver 702 (block 904). The example filter(s) 706 filter the amplified IR signal (block 906). For example, other devices within a media system (e.g., fixed light sources) may emit some IR light. This miscellaneous IR light is unrelated to the IR signal transmitted from the controller 410 and, thus, the example filter(s) 706 are used to remove the miscellaneous IR light from the amplified IR signal. Additionally, there may be some DC offset within the amplified IR signal which is removed by the example filter(s) 706. The example offset controller 708 adds DC offset of the filtered IR signal (block 908). The filtered IR signal is offset to allow the IR signal to be biased on (e.g., to allow an LED to emit a constant background of steady, slight IR light). The example offset controller 708 adds the DC offset to the filtered IR signal in a controlled manner so that each IR signal processed by the audio playback device 402 will be offset by a sufficient amount to be interpreted by the display device 404. The example current driver(s) 710 provide linear current sources for the offset IR signal (block 910). The example output 712 relayed the manipulated IR signal via, for example, a plurality of LEDs (block 912). The example method 900 can end and/or iterate after another IR signal is received (block 902).

Figure 10:
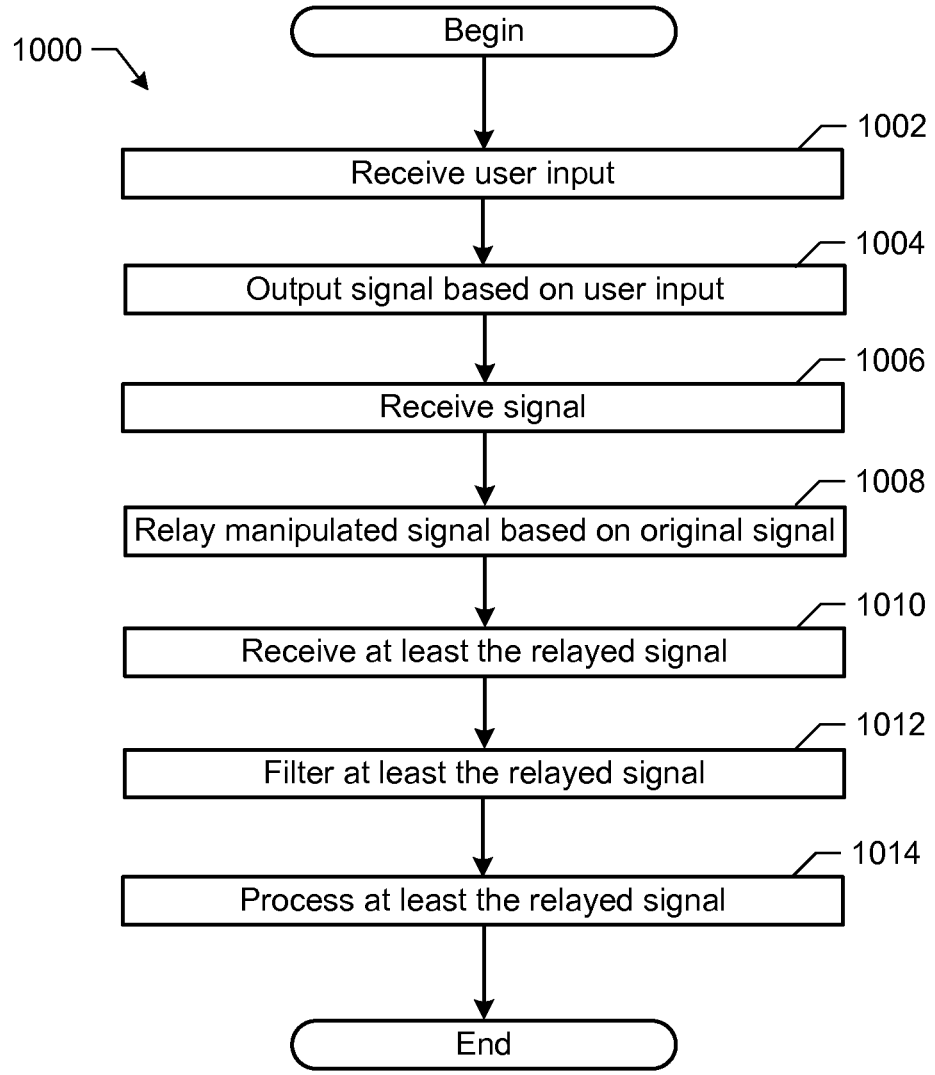
FIG. 10 shows a flowchart representative of an example method to process an infrared signal.

FIG. 10 shows a flowchart representative of an example method 1000 to process an IR signal. The example method 1000 of FIG. 10 begins when the controller 410 (FIG. 4) receives a user input to control the audio playback device 402 and/or the display device 404 (block 1002). For example, the user input may indicate a volume and/or audio/video source change. The example controller 410 outputs an IR signal based on the user input (block 1004). For example, the controller 410 generates the IR signal representative of a volume and/or audio source change. The example IR provider 424 (FIG. 4) of the example audio playback device 402 receives the IR signal (block 1006) and relays a manipulated IR signal based on the original IR signal (block 1006). The process for manipulating and relaying the IR signal is described above with reference to FIG. 9. The example receiver 802 of the display device 404 receives at least the relayed IR signal (block 1010). For example, the receiver 802 receives the relayed IR signal or a combination of the original and relayed IR signals. Because the relayed IR signal is created linearly and without significant delay by the example IR provider 424, the relayed IR signal may be combined with and/or processed with the original IR signal as a single IR signal to avoid confusion in processing by the display device 404. The example filter(s) 804 filter at least the relayed IR signal to remove any miscellaneous IR light (e.g., IR light from fixed light sources within a zone) from the at least relayed IR signal and to remove DC offset in the at least relayed IR signal (block 1012). The example processor 806 processes at least the relayed IR signal to implement the input of the user received at block 1002 (block 1014). For example, the processor 806 demodulates the relayed IR signal and implements a volume and/or audio source change based on the demodulated IR signal. The example method 1000 ends and/or iterates after receiving another user input at the controller 410 (block 1002).

In an example household, a user may set up a media system such that a sound bar is located in close proximity to a television (e.g., in front of a television). In such an example, the sound bar may be used to provide audio rather than speakers on the television itself (or in addition to the speakers on the television). A user within the household (e.g., sitting on a chair directly in front of the sound bar) may wish to use a remote control to instruct the television to power on. Because of the location of the sound bar in relation to the television, the sound bar receives the instruction from the remote control. The sound bar then relays the instruction to the television using, for example, LEDs on the back side of the sound bar (as the back side of the sound bar is in front of the television). The television receives the relayed instruction from the sound bar, processes the instruction, and powers on according to the instruction.

If, for example, the user (e.g., sitting on a couch left of the sound bar) is angled from the television and the sound bar so that the television can receive the original instruction from the remote control and the relayed instruction from the sound bar, the television is still able to operate because it receives and processes both instructions as a single instruction to power on. The television can process both instructions as a single instruction because the sound bar relays the instruction without significant delay (e.g., with minimal processing) and in a linear manner.

V. Conclusion

In view of the foregoing, it should be apparent that disclosed example methods and apparatus can be used to enable an audio playback device to receive a signal (e.g., an IR signal) from a user controller (e.g., a remote control) and to provide the signal to a display device (e.g., a television). In such examples, the audio playback device may block (or partially block) IR sensors on the display device, but still enable a user to control the presentation device with the user controller.

In the example methods and apparatus disclosed herein, the audio playback device receives an IR signal from a user controller, manipulates the IR signal, and relays the manipulated IR signal in analog form to a display device. In such examples, the relayed IR signal is linear and is transmitted to the display device without significant delay because the relayed IR signal is not processed in digital form. Thus, the display device may receive and process the original IR signal from the controller and/or the relayed IR signal from the audio playback device as a single IR signal.

The description discloses various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

Additionally, reference herein to "embodiment" indicates that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

I claim:

1. A method, comprising:
    receiving a first signal from a first device, the first signal being analog and representative of a command;
    linearly manipulating the first signal in analog form, wherein the manipulated signal remains analog; and
    relaying the manipulated signal to a second device, the relayed manipulated signal being representative of the command, wherein the relayed manipulated signal is indistinguishable from the first signal by the second device such that the second device receives the first signal and the relayed manipulated signal as a single signal.

2. The method of claim 1, wherein manipulating the first signal comprises:
    amplifying the first signal;
    filtering the first signal;
    offsetting the first signal; and
    providing a current source to the first signal, wherein the current source is linear.

3. The method of claim 1, wherein the first signal is an infrared signal.

4. The method of claim 1, wherein the manipulated signal is relayed using at least one light-emitting diode.

5. The method of claim 1, wherein the relayed manipulated signal is indistinguishable from the first signal by the second device such that the second device processes the single signal to execute the command.

6. The method of claim 1, wherein the single signal is a sum of the first signal and the relayed manipulated signal.

7. The method of claim 1, wherein the method is executed by a playback device.

8. An apparatus, comprising:
    an infrared provider to:
        receive a first signal from a first device, the first signal being analog and representative of a command;
        linearly manipulate the first signal in analog form, wherein the manipulated signal remains analog; and
        relay the manipulated signal to a second device, the relayed manipulated signal being representative of the command, wherein the relayed manipulated signal is indistinguishable from the first signal by the second device such that the second device receives the first signal and the relayed manipulated signal as a single signal.

9. The apparatus of claim 8, wherein the infrared provider is to:
    amplify the first signal;
    filter the first signal;
    offset the first signal; and
    provide a current source to the first signal, wherein the current source is linear.

10. The apparatus of claim 8, wherein the manipulated signal is relayed using at least one light-emitting diode.

11. The apparatus of claim 8, wherein the relayed manipulated signal is indistinguishable from the first signal by the second device such that the second device processes the single signal to execute the command.

12. The apparatus of claim 8, wherein the single signal is a sum of the first signal and the relayed manipulated signal.

13. The apparatus of claim 8, wherein the infrared provider is located within a playback device.

14. An audio playback device, comprising:
    an audio output device to generate an audio signal based on an audio signal source;
    a processor to control the audio output device; and
    an infrared provider to:
        receive a first signal from a first device, the first signal being analog and representative of a command;
        linearly manipulate the first signal in analog form, wherein the manipulated signal remains analog; and
        relay the manipulated signal to a second device, the relayed manipulated signal being representative of the command, wherein the relayed manipulated signal is indistinguishable from the first signal by the second device such that the second device receives the first signal and the relayed manipulated signal as a single signal.

15. The device of claim 14, wherein the relayed manipulated signal is indistinguishable from the first signal by the second device such that the second device processes the single signal to execute the command.

16. The device of claim 14, wherein the single signal is a sum of the first signal and the relayed manipulated signal.

17. The apparatus of claim 8, wherein the first signal is an infrared signal.

* * * * *